(12) United States Patent
Arase

(10) Patent No.: US 11,021,105 B2
(45) Date of Patent: Jun. 1, 2021

(54) BIRD'S-EYE VIEW VIDEO GENERATION DEVICE, BIRD'S-EYE VIEW VIDEO GENERATION METHOD, AND NON-TRANSITORY STORAGE MEDIUM

(71) Applicant: JVCKENWOOD Corporation, Yokohama (JP)

(72) Inventor: Takayuki Arase, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/716,567

(22) Filed: Dec. 17, 2019

(65) Prior Publication Data

US 2020/0114823 A1 Apr. 16, 2020

Related U.S. Application Data

(63) Continuation of application No. PCT/JP2018/011782, filed on Mar. 23, 2018.

(30) Foreign Application Priority Data

Jul. 31, 2017 (JP) .............................. JP2017-147716
Sep. 27, 2017 (JP) .............................. JP2017-185691

(51) Int. Cl.
*B60R 1/00* (2006.01)
*G06K 9/00* (2006.01)
*B60R 11/04* (2006.01)

(52) U.S. Cl.
CPC ................ *B60R 1/00* (2013.01); *B60R 11/04* (2013.01); *G06K 9/00825* (2013.01);
(Continued)

(58) Field of Classification Search
CPC .............................................. B60R 2300/607
See application file for complete search history.

(56) References Cited

U.S. PATENT DOCUMENTS 7,005,974 B2 * 2/2006 McMahon ............. B60Q 9/005
  248/200
9,446,713 B2 * 9/2016 Lu .......................... B60R 1/002
(Continued)

FOREIGN PATENT DOCUMENTS

JP  2003-312415   11/2003
JP  2015-076645   4/2015

OTHER PUBLICATIONS

International Search Report and Written Opinion for International Patent Application No. PCT/JP2018/011782 dated Jun. 12, 2018, 11 pages.

*Primary Examiner* — Paulos M Natnael
(74) *Attorney, Agent, or Firm* — Amin, Turocy & Watson, LLP

(57) ABSTRACT

A bird's-eye view video generation device includes a video data acquisition unit that acquires surrounding video data of a vehicle captured by imagers, a surrounding information acquisition unit that acquires surrounding information around the vehicle, a vehicle information acquisition unit that acquires vehicle information, a bird's-eye view video generation unit that generates a bird's-eye view video of the vehicle based on the acquired surrounding video data, and a display controller that causes a display to display the bird's-eye view video in at least one of a case in which a surrounding vehicle turns on a direction indicator, and a case in which an entrance/exit into/from which the vehicle can enter/exit or a starting point of a branch lane is located at the side of the vehicle based on the vehicle and/or surrounding information.

13 Claims, 12 Drawing Sheets

(52) U.S. Cl.
CPC ... *B60R 2300/302* (2013.01); *B60R 2300/607* (2013.01); *B60R 2300/804* (2013.01)

(56) References Cited

U.S. PATENT DOCUMENTS

| | | | | |
|---|---|---|---|---|
| 2007/0057816 | A1* | 3/2007 | Sakakibara | B62D 15/0275 340/932.2 |
| 2018/0089907 | A1* | 3/2018 | Maruoka | B60K 35/00 |
| 2018/0255274 | A1* | 9/2018 | Arase | H04N 5/2628 |
| 2018/0357484 | A1* | 12/2018 | Omata | G06K 9/00818 |
| 2019/0026557 | A1* | 1/2019 | Watanabe | G06T 1/00 |
| 2019/0084495 | A1* | 3/2019 | Yamada | H04N 7/181 |
| 2019/0116315 | A1* | 4/2019 | Satomi | H04N 5/23238 |

* cited by examiner

BIRD'S-EYE VIEW VIDEO GENERATION DEVICE, BIRD'S-EYE VIEW VIDEO GENERATION METHOD, AND NON-TRANSITORY STORAGE MEDIUM

CROSS-REFERENCE TO RELATED APPLICATIONS

This application is a continuation of PCT International Application No. PCT/JP2018/011782 filed in Japan on Mar. 23, 2018, which claims priority to and incorporates by references the entire contents of Japanese Patent Application No. 2017-147716 filed in Japan on Jul. 31, 2017 and Japanese Patent Application No. 2017-185691 filed in Japan on Sep. 27, 2017.

FIELD

The present application relates to a bird's-eye view video generation device, a bird's-eye view video generation method, and a non-transitory storage medium.

BACKGROUND

A technology relating to a vehicle surrounding display device that displays a bird's-eye view image of a vehicle with a vehicle image has been known (for example, see Japanese Laid-open Patent Application No. 2015-076645). In this technology, when a travel direction of a vehicle is switched from a forward direction to a backward direction, a display area of the bird's-eye view image behind a rear of the vehicle is enlarged.

SUMMARY

A vehicle may be stopped at a traffic light or by traffic congestion while moving. For example, when an entrance/exit of a parking lot, an entrance/exit of an alley, or a starting point of a branch lane is located at a side of the vehicle, depending on the stop position of the vehicle, the vehicle may block another vehicle that is intending to move to the entrance/exit or the branch lane from passing through smoothly. Moreover, for example, when a driver intends to move the vehicle to the branch lane as a right-turn lane through the starting point thereof and when a distance between a preceding vehicle and the vehicle is difficult to recognize, it is sometimes difficult for the driver to determine whether it is possible to move the vehicle to the right-turn lane. Thus, to support the driver to confirm the distance between the preceding vehicle or the following vehicle and the vehicle, when the driver wishes to confirm the distance between the preceding vehicle or the following vehicle and the vehicle, it is preferable to display vehicle surroundings in a confirmable manner.

A bird's-eye view video generation device, a bird's-eye view video generation method, and a non-transitory storage medium are disclosed.

According to one aspect, there is provided a bird's-eye view video generation device, comprising: a video data acquisition unit configured to acquire surrounding video data captured by imagers for capturing videos of surroundings of a vehicle; a surrounding information acquisition unit configured to acquire surrounding information indicating a state of the surroundings around the vehicle; a vehicle information acquisition unit configured to acquire vehicle information including a speed of the vehicle; a bird's-eye view video generation unit configured to generate a bird's-eye view video of a display area in which the surroundings of the vehicle is displayed by performing a viewpoint conversion process on the surrounding video data acquired by the video data acquisition unit and performing a synthesizing process on multiple pieces of the surrounding video data on which the viewpoint conversion process has been performed; and a display controller configured to cause a display to display the bird's-eye view video generated by the bird's-eye view video generation unit in at least one of a case in which at least one surrounding vehicle a direction indicator of which is turned ON is located based on the surrounding information acquired by the surrounding information acquisition unit, a case in which an entrance/exit into/from which the vehicle can enter/exit is located at a side of the vehicle based on the surrounding information acquired by the surrounding information acquisition unit and the vehicle information acquired by the vehicle information acquisition unit, and a case in which a starting point of a branch lane is located at the side of the vehicle based on the surrounding information acquired by the surrounding information acquisition unit and the vehicle information acquired by the vehicle information acquisition unit.

According to one aspect, there is provided a bird's-eye view video generation method, comprising: acquiring surrounding video data captured by imagers for capturing videos of surroundings of a vehicle; acquiring surrounding information indicating a state of the surroundings around the vehicle; a acquiring vehicle information including a speed of the vehicle; generating a bird's-eye view video of a display area in which the surroundings of the vehicle is displayed by performing a viewpoint conversion process on the acquired surrounding video data and performing a synthesizing process on multiple pieces of the surrounding video data on which the viewpoint conversion process has been performed; and causing a display to display the generated bird's-eye view video in at least one of a case in which at least one surrounding vehicle a direction indicator of which is turned ON is located based on the surrounding information acquired by the surrounding information acquisition step, a case in which an entrance/exit into/from which the vehicle can enter/exit is located at a side of the vehicle based on the surrounding information acquired by the surrounding information acquisition step and the vehicle information acquired by the vehicle information acquisition step, and a case in which a starting point of a branch lane is located at the side of the vehicle based on the surrounding information acquired by the surrounding information acquisition step and the vehicle information acquired by the vehicle information acquisition step.

According to one aspect, there is provided a non-transitory storage medium that stores a computer program causing a computer operating as a bird's-eye view video generation device to execute a process comprising: acquiring surrounding video data captured by imagers for capturing videos of surroundings of a vehicle; acquiring surrounding information indicating a state of the surroundings around the vehicle; a acquiring vehicle information including a speed of the vehicle; generating a bird's-eye view video of a display area in which the surroundings of the vehicle is displayed by performing a viewpoint conversion process on the acquired surrounding video data and performing a synthesizing process on multiple pieces of the surrounding video data on which the viewpoint conversion process has been performed; and causing a display to display the generated bird's-eye view video in at least one of a case in which at least one surrounding vehicle a direction indicator of which is turned ON is located based on the surrounding information acquired by the surrounding information acquisition step, a case in which an entrance/exit into/from which the vehicle can enter/exit is located at a side of the vehicle based on the surrounding information acquired by the surrounding information acquisition step and the vehicle information acquired by the vehicle information acquisition step, and a case in which a starting point of a branch lane is located at the side of the vehicle based on the surrounding information acquired by the surrounding information acquisition step and the vehicle information acquired by the vehicle information acquisition step.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Hereinafter, embodiments of a bird's-eye view video generation device 40, a bird's-eye view video generation system 1, a bird's-eye view video generation method, and a non-transitory storage medium according to the present application will be described in detail with reference to the accompanying drawings. However, the present application is not limited to the following embodiments.

First Embodiment

Figure 1:
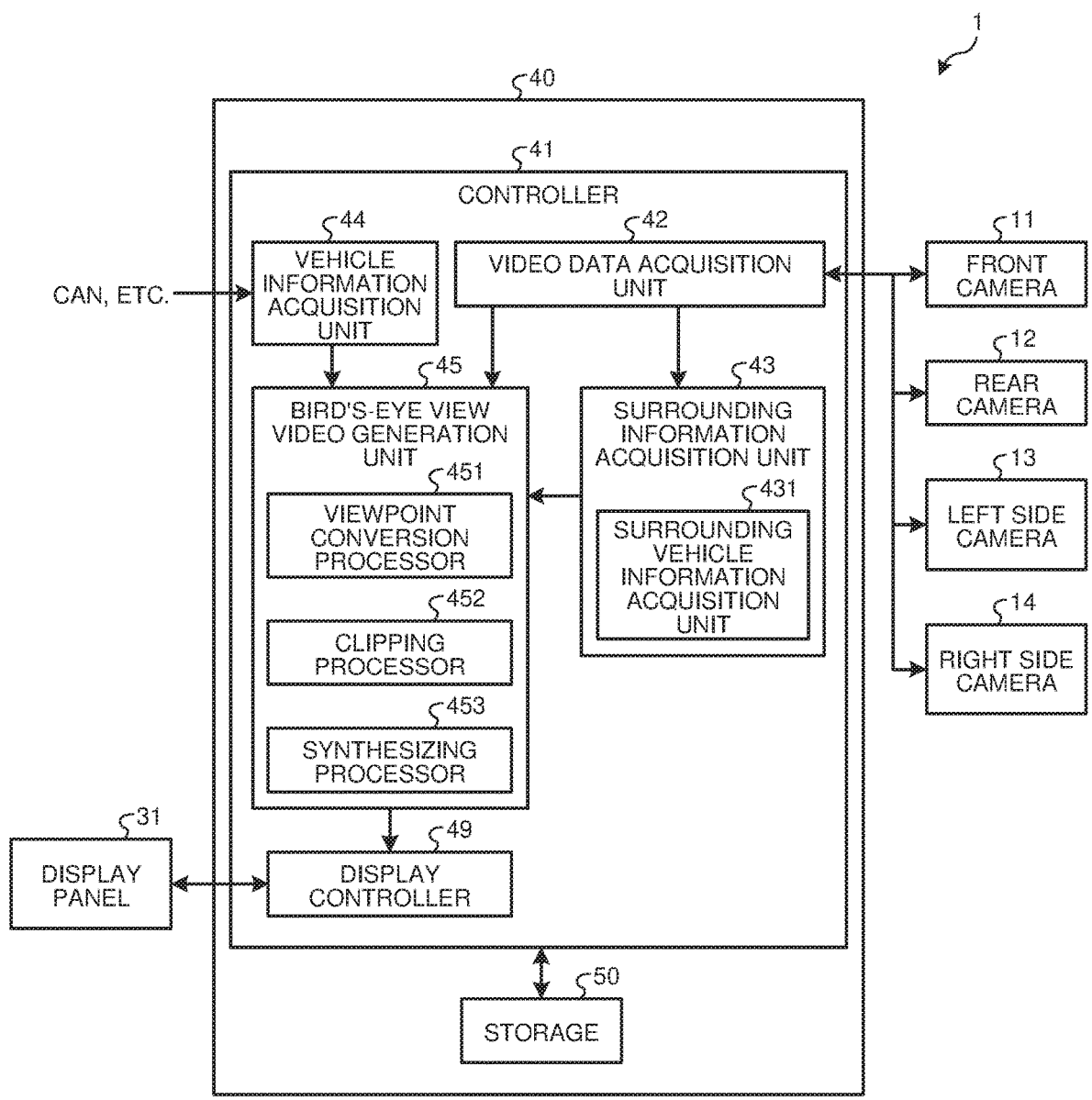
FIG. 1 is a block diagram illustrating a configuration example of a bird's-eye view video generation system according to a first embodiment.
Figure 2:
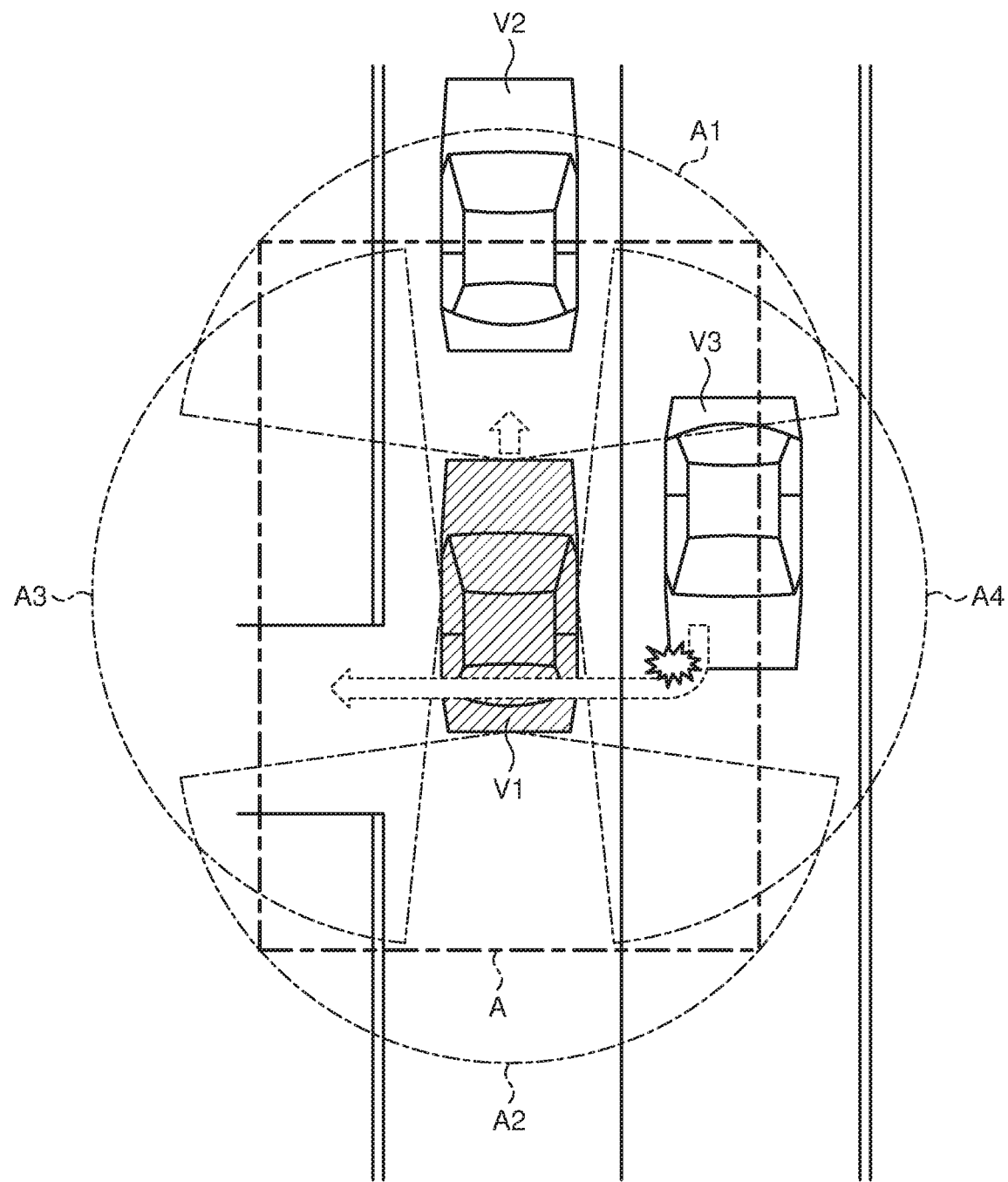
FIG. 2 is a diagram for explaining the bird's-eye view video generation system according to the first embodiment, and illustrates a vehicle and the surroundings thereof.

FIG. 1 is a block diagram illustrating a configuration example of a bird's-eye view video generation system according to a first embodiment. FIG. 2 is a diagram for explaining the bird's-eye view video generation system according to the first embodiment, and illustrates a vehicle and the surroundings thereof. Based on surrounding information acquired by a surrounding information acquisition unit 43 and vehicle information acquired by a vehicle information acquisition unit 44, the bird's-eye view video generation system 1 generates and displays bird's-eye view video 100 (see FIG. 3). More specifically, based on the surrounding information and the vehicle information, when it is determined that a distance between a vehicle V1 and a surrounding vehicle around the vehicle V1 should be confirmed, the bird's-eye view video generation system 1 generates and displays the bird's-eye view video 100. For example, the surrounding vehicle includes a preceding vehicle V2 positioned in front of the vehicle V1 or a following vehicle.

The bird's-eye view video generation device 40 and the bird's-eye view video generation system 1 are mounted on the vehicle V1. In addition to those mounted on the vehicle V1, the bird's-eye view video generation device 40 and the bird's-eye view video generation system 1 may also be portable devices that can be used for the vehicle V1.

The bird's-eye view video generation system 1 will now be described with reference to FIG. 1. The bird's-eye view video generation system 1 includes a front camera (imager) 11, a rear camera (imager) 12, a left side camera (imager) 13, a right side camera (imager) 14, a display panel (display) 31, and the bird's-eye view video generation device 40.

The front camera 11 is used for a bird's-eye view video camera. The front camera 11 is disposed at a front side of the vehicle V1, and captures video of the surroundings of the vehicle V1 around a front. As illustrated in FIG. 2, for example, the front camera 11 captures video of a first imaging area A1 at about 180 degrees. The first imaging area A1 includes an area in front of the vehicle V1 larger than a display area A of the bird's-eye view video 100. The front camera 11 outputs the captured video to a video data acquisition unit 42 of the bird's-eye view video generation device 40.

The rear camera 12 is used for a bird's-eye view video camera. The rear camera 12 is disposed at a rear side of the vehicle V1, and captures video of the surroundings of the vehicle V1 around the rear. For example, the rear camera 12 captures video of a second imaging area A2 at about 180 degrees. The second imaging area A2 includes an area in the rear of the vehicle V1 larger than the display area A of the bird's-eye view video 100. The rear camera 12 outputs the captured video to the video data acquisition unit 42 of the bird's-eye view video generation device 40.

The left side camera 13 is used for a bird's-eye view video camera. The left side camera 13 is disposed at a left side of the vehicle V1, and captures video of the surroundings of the vehicle V1 around the left side. For example, the left side camera 13 captures video of a third imaging area A3 at about 180 degrees. The third imaging area A3 includes an area at the left side of the vehicle V1 larger than the display area A of the bird's-eye view video 100. The left side camera 13 outputs the captured video to the video data acquisition unit 42 of the bird's-eye view video generation device 40.

The right side camera 14 is used for a bird's-eye view video camera. The right side camera 14 is disposed at a right side of the vehicle V1, and captures video of the surroundings of the vehicle V1 around the right side. For example, the right side camera 14 captures video of a fourth imaging area A4 at about 180 degrees. The fourth imaging area A4 includes an area at the right side of the vehicle V1 larger than the display area A of the bird's-eye view video 100. The right side camera 14 outputs the captured video to the video data acquisition unit 42 of the bird's-eye view video generation device 40.

The front camera 11, the rear camera 12, the left side camera 13, and the right side camera 14 capture video of the vehicle V1 in the omni-direction.

Returning to FIG. 1, for example, the display panel 31 is a display including a liquid crystal display (LCD) or an organic electro-luminescence (EL) display. The display panel 31 displays the bird's-eye view video 100 based on a video signal output from the bird's-eye view video generation device 40 of the bird's-eye view video generation system 1. The display panel 31 may be dedicated to the bird's-eye view video generation system 1, and for example, may be commonly used with another system including a navigation system. The display panel 31 is disposed at a position that can be easily viewed by a driver.

The bird's-eye view video generation device 40 includes a controller 41 and a storage 50.

For example, the controller 41 is an arithmetic processing device configured by a central processing unit (CPU) and the like. The controller 41 loads computer programs stored in the storage 50 into memory, and executes the commands included in the computer programs. The controller 41 includes the video data acquisition unit 42, the surrounding information acquisition unit 43, the vehicle information acquisition unit 44, a bird's-eye view video generation unit 45, and a display controller 49. The controller 41 includes an internal memory, which is not illustrated, and the internal memory in the controller 41 is used for temporarily storing data and the like.

The video data acquisition unit 42 acquires surrounding video data obtained by capturing video of the surroundings of the vehicle V1. More specifically, the video data acquisition unit 42 acquires video data output from the front camera 11, the rear camera 12, the left side camera 13, and the right side camera 14. The video data acquisition unit 42 outputs the acquired video data to the surrounding information acquisition unit 43 and the bird's-eye view video generation unit 45. For example, the video data acquired from each of the cameras is a moving image formed of images of 30 frames per second.

The surrounding information acquisition unit 43 acquires surrounding information indicating a state of the surroundings of the vehicle. In the surrounding information acquisition unit 43 of the present embodiment, a surrounding vehicle information acquisition unit 431 detects another vehicle V3 a direction indicator of which is turned ON from the surrounding video acquired by the video data acquisition unit 42, and sets the detection result as the surrounding information. In other words, the surrounding vehicle information acquisition unit 431 performs an imaging process on the surrounding video captured by at least one of the front camera 11, the rear camera 12, the left side camera 13, and the right side camera 14, detects the other vehicle V3 the direction indicator of which is turned ON, and sets the detection result as the surrounding information. Whether the direction indicator is turned ON can be determined by a combination of existing technologies such as image recognition of a vehicle, extraction of contours in the horizontal direction, and acquiring brightness and chromaticity of the contours as a numerical value. The surrounding information acquisition unit 43 outputs the acquired surrounding information to the bird's-eye view video generation unit 45.

The other vehicle V3 is a vehicle at a position near the vehicle V1. The other vehicle V3 includes a following vehicle positioned behind the vehicle V1, and a vehicle that is positioned at a side of the vehicle V1 and that is intending to pass in front of or behind the vehicle V1. For example, the following vehicle is a vehicle the direction indicator of which is turned ON to move to a branch line. For example, the vehicle positioned at the side of the vehicle V1 is a vehicle the direction indicator of which is turned ON to pass in front of or behind the vehicle V1 in order to turn right from the opposite lane to enter a parking lot at a left side of the vehicle V1. For example, the vehicle positioned at the side of the vehicle V1 is a vehicle the direction indicator of which is turned ON to pass in front of or behind the vehicle V1 in order to turn right to enter the opposite lane from a parking lot at the left side of the vehicle V1.

Moreover, among a plurality of the other vehicles V3 the direction indicator of which is turned ON and that are intending to change the route, the surrounding vehicle information acquisition unit 431 may also detect the other vehicle V3 which is prevented from passing through due to the vehicle V1 being stopped. For example, the surrounding vehicle information acquisition unit 431 may only detect the other vehicle V3 the direction indicator of which is turned ON and that is stopped. Moreover, for example, the surrounding vehicle information acquisition unit 431 may perform an imaging process on the surrounding video, and only detect the other vehicle V3 stopped close to a side toward which the direction indicator is turned ON. Furthermore, for example, the surrounding vehicle information acquisition unit 431 may perform an imaging process on the surrounding video, and only detect the other vehicle V3 close to the vehicle V1 the distance therebetween is equal to or less than a threshold.

The vehicle information acquisition unit 44 acquires vehicle information indicating a state of the vehicle V1, through a controller area network (CAN) or various sensors that detect the state of the vehicle V1. For example, the vehicle information acquisition unit 44 acquires vehicle speed information. The vehicle information acquisition unit 44 outputs the acquired vehicle information to the bird's-eye view video generation unit 45.

The bird's-eye view video generation unit 45 generates the bird's-eye view video 100 of a display area in which the surroundings of the vehicle V1 is displayed by performing a viewpoint conversion process on the surrounding video acquired by the video data acquisition unit 42 and performing a synthesis process on a plurality of pieces of the surrounding video on which the viewpoint conversion process is performed. More specifically, based on the surrounding information indicating the state of surroundings acquired by the surrounding information acquisition unit 43 and the vehicle information acquired by the vehicle information acquisition unit 44, when it is determined that the distance between the vehicle V1 and the surrounding vehicle of the vehicle V1 should be confirmed, the bird's-eye view video generation unit 45 generates the bird's-eye view video 100. In the present embodiment, based on the surrounding information and the vehicle information, when the other vehicle V3 the direction indicator of which is turned ON is located, the bird's-eye view video generation unit 45 determines that the distance between the vehicle V1 and the surrounding vehicle of the vehicle V1 should be confirmed, and generates the bird's-eye view video 100.

Moreover, the bird's-eye view video generation unit 45 may determine whether the speed of the vehicle V1 is equal to or less than a threshold. More specifically, based on the surrounding information and the vehicle information, when the speed of the vehicle V1 is equal to less than a threshold, and when the other vehicle V3 the direction indicator of which is turned ON is located, the bird's-eye view video generation unit 45 may determine that the distance between the vehicle V1 and the surrounding vehicle of the vehicle V1 should be confirmed, and generate the bird's-eye view video 100. In the present embodiment, the threshold of the vehicle speed of the vehicle V1 is 20 km/h. For example, this numerical value may also be set according to the width and speed limit of the road on which the vehicle V1 is moving, or may be optionally set by a user.

Furthermore, based on at least one of preceding vehicle information including at least one of the vehicle speed of the preceding vehicle V2 that is moving in front of the vehicle V1, the distance between the vehicle V1 and the preceding vehicle V2, and relative speed between the vehicle V1 and the preceding vehicle V2 obtained by a preceding vehicle information acquisition unit, which is not illustrated, of the surrounding information acquisition unit 43, the vehicle information acquired by the vehicle information acquisition unit 44, and the surrounding information indicating the state of surroundings acquired by the surrounding information acquisition unit 43, the bird's-eye view video generation unit 45 may also determine whether the vehicle V1 is likely to stop. For example, when the speed or an acceleration speed of the vehicle V1 is equal to or less than a threshold, or when information such as the traffic light ahead is red or the like is acquired, the bird's-eye view video generation unit 45 determines that the vehicle V1 is likely to stop. Alternatively, for example, while the preceding vehicle V2 is located, when a speed of the preceding vehicle V2 is equal to or less than a threshold, when a distance between the vehicle V1 and the preceding vehicle V2 is equal to or less than a threshold, or when a relative speed between the vehicle V1 and the preceding vehicle V2 is equal to or less than a threshold, the bird's-eye view video generation unit 45 determines that the vehicle V1 is likely to stop.

The bird's-eye view video generation unit 45 outputs the generated bird's-eye view video 100 to the display controller 49. The bird's-eye view video generation unit 45 includes a viewpoint conversion processor 451, a clipping processor 452, and a synthesizing processor 453.

The viewpoint conversion processor 451 performs a viewpoint conversion process on the surrounding video data acquired by the video data acquisition unit 42 such that the vehicle V1 is looked down from above. More specifically, based on the surrounding video data captured by the front camera 11, the rear camera 12, the left side camera 13, and the right side camera 14, the viewpoint conversion processor 451 generates video on which the viewpoint conversion process is performed. A method of the viewpoint conversion process is not limited, and may by any known method. The viewpoint conversion processor 451 outputs the surrounding video data on which the viewpoint conversion process is performed to the clipping processor 452.

The clipping processor 452 performs a clipping process of clipping video of a predetermined range in the surrounding video data on which the viewpoint conversion process is performed. The clipping area is registered and stored in advance. The clipping processor 452 outputs the video data of the video on which the clipping process is performed to the synthesizing processor 453.

The synthesizing processor 453 performs a synthesis process of synthesizing video data on which the clipping process is performed. The synthesizing processor 453 generates the bird's-eye view video 100 in which a vehicle icon 110 is displayed on the synthesized video.

Figure 3:
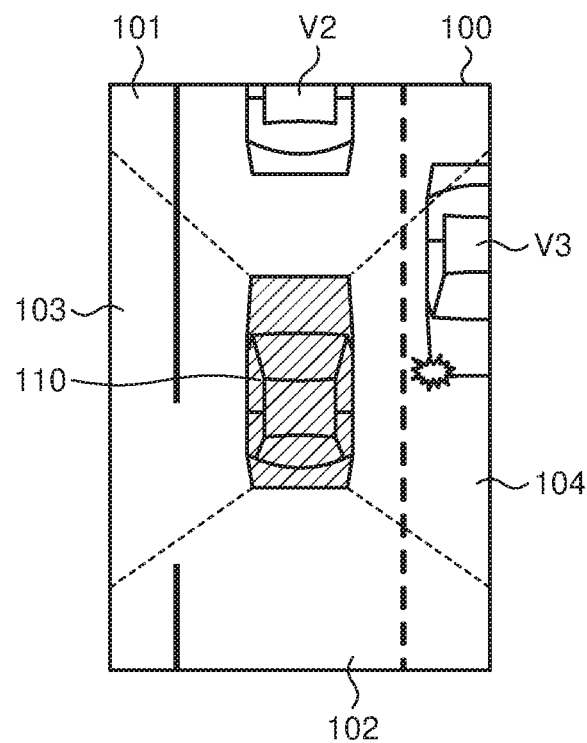
FIG. 3 is a diagram illustrating an example of bird's-eye view video generated by the bird's-eye view video generation system according to the first embodiment.

The bird's-eye view video 100 will now be described with reference to FIG. 3. FIG. 3 is a diagram illustrating an example of bird's-eye view video generated by the bird's-eye view video generation system according to the first embodiment. The bird's-eye view video 100 displays a predetermined display area A from the vehicle V1. The bird's-eye view video 100 includes a front video 101, a rear video 102, a left side video 103, and a right side video 104. The bird's-eye view video 100 also includes the vehicle icon 110 positioned in a center portion surrounded by the front video 101, the rear video 102, the left side video 103, and the right side video 104. The vehicle icon 110 indicates a position and an orientation of the vehicle V1. The vehicle icon 110 is disposed in the center portion such that the longitudinal direction thereof is parallel with the longitudinal direction of the bird's-eye view video 100. The bird's-eye view video 100 allows the driver to identify at least one of a relative positional relationship between a front end part of the vehicle V1 and a rear end part of the preceding vehicle V2 and a relative positional relationship between a rear end part of the vehicle V1 and a front end part of the following vehicle. In the present embodiment, the vehicle icon 110, the preceding vehicle V2, and the other vehicle V3 are displayed in the bird's-eye view video 100. In the present embodiment, it is preferable that the bird's-eye view video 100 allows the driver to identify the relative positional relationship between the front end part of the vehicle V1 and the rear end part of the preceding vehicle V2. In the present embodiment, it is preferable that the bird's-eye view video 100 allows the driver to identify the relative positional relationship between the vehicle V1 and the other vehicle V3.

In FIG. 3, oblique broken lines indicate boundaries between the front video 101, the rear video 102, the left side video 103, and the right side video 104 for explanation. However, the oblique broken lines may not be displayed on the actual bird's-eye view video 100 displayed on the display panel 31. The same applies to the other drawings.

The display controller 49 causes the display panel 31 to display the bird's-eye view video 100 generated by the bird's-eye view video generation unit 45. More specifically, based on the surrounding information indicating the state of surroundings acquired by the surrounding information acquisition unit 43 and the vehicle information acquired by the vehicle information acquisition unit 44, when it is determined that the distance between the vehicle V1 and the surrounding vehicle of the vehicle V1 should be confirmed, the display controller 49 displays the bird's-eye view video 100 on the display panel 31. In the present embodiment, based on the surrounding information and the vehicle information, when the other vehicle V3 the direction indicator of which is turned ON is located, the display controller 49 determines that the distance between the vehicle V1 and the surrounding vehicle of the vehicle V1 should be confirmed, and displays the bird's-eye view video 100 on the display panel 31.

Moreover, the display controller 49 may determine whether the speed of the vehicle V1 is equal to or less than a threshold. More specifically, based on the surrounding information and the vehicle information, when the speed of the vehicle V1 is equal to or less than a threshold, and when the other vehicle V3 the direction indicator of which is turned ON is located, the display controller 49 may determine that the distance between the vehicle V1 and the surrounding vehicle of the vehicle V1 should be confirmed, and display the bird's-eye view video 100 on the display panel 31.

The storage 50 stores therein data required for various processes performed by the bird's-eye view video generation device 40 and various processing results. For example, the storage 50 is a semiconductor memory device such as a random access memory (RAM), a read only memory (ROM), and a flash memory. Alternatively, the storage 50 is a storage device such as a hard disk and an optical disc.

Figure 4:
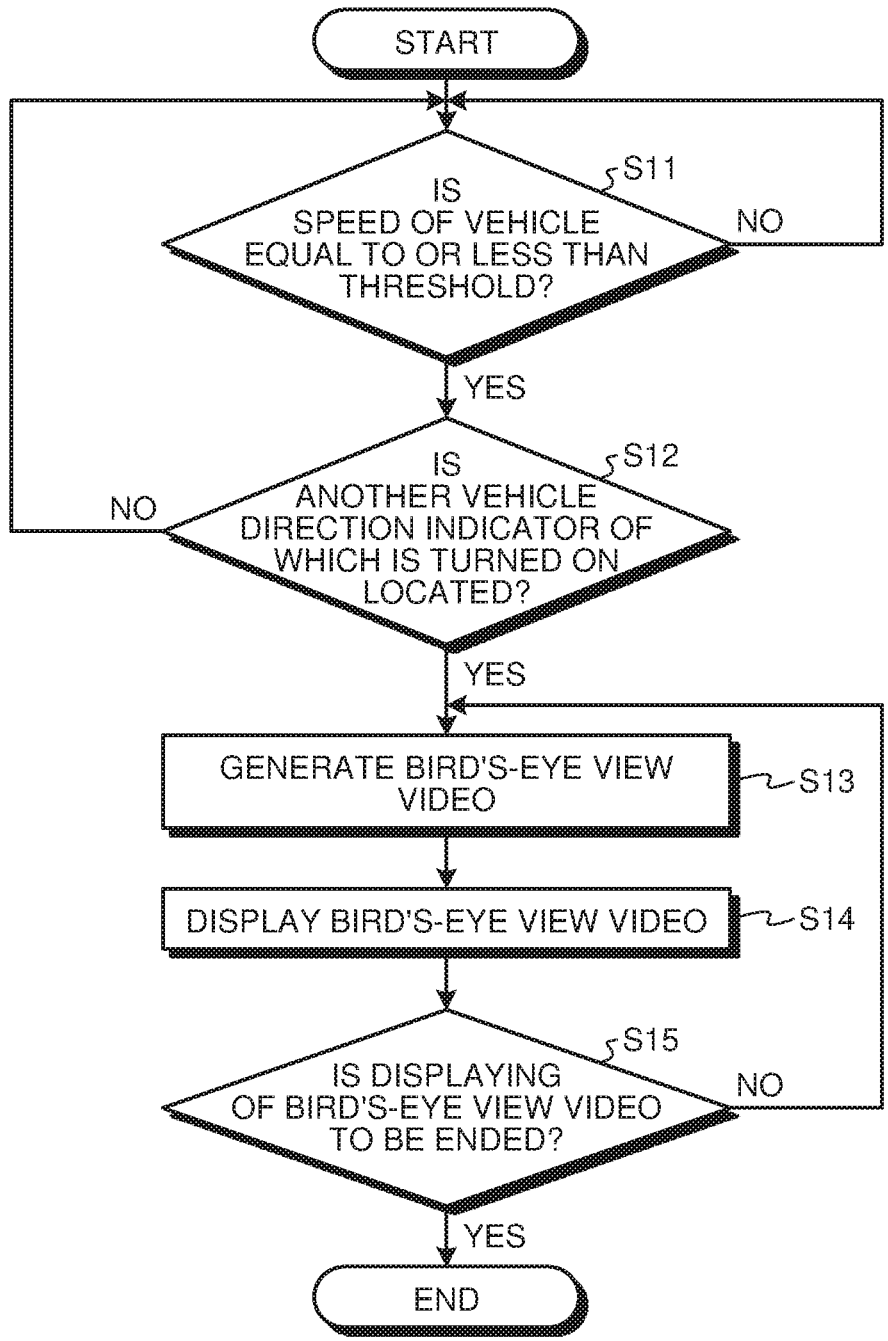
FIG. 4 is a flowchart illustrating a flow of processes performed by a bird's-eye view video generation device of the bird's-eye view video generation system according to the first embodiment.

Next, a flow of processes performed by the bird's-eye view video generation device 40 will be described with reference to FIG. 4. FIG. 4 is a flowchart illustrating a flow of processes performed by a bird's-eye view video generation device of the bird's-eye view video generation system according to the first embodiment.

The controller 41 determines whether the speed of the vehicle V1 is equal to or less than a threshold (step S11). More specifically, when it is determined that the speed of the vehicle V1 is equal to or less than a threshold based on the vehicle information acquired by the vehicle information acquisition unit 44 (Yes at step S11), the controller 41 proceeds to step S12. When it is determined that the speed of the vehicle V1 is not equal to or less than a threshold based on the vehicle information acquired by the vehicle information acquisition unit 44 (No at step S11), the controller 41 executes the process at step S11 again.

The controller 41 determines whether the other vehicle V3 the direction indicator of which is turned ON is located (step S12). More specifically, in the controller 41, the surrounding information acquisition unit 43 detects the other vehicle V3 the direction indicator of which is turned ON in the surrounding video acquired by the video data acquisition unit 42, and sets the detection result as surrounding information. When it is determined that the other vehicle V3 the direction indicator of which is turned ON is located based on the surrounding information acquired by the surrounding information acquisition unit 43 (Yes at step S12), the controller 41 proceeds to step S13. When it is determined that no other vehicle V3 the direction indicator of which is turned ON is located based on the surrounding information acquired by the surrounding information acquisition unit 43 (No at step S12), the controller 41 executes the process at step S11 again.

The controller 41 generates the bird's-eye view video 100 (step S13). More specifically, in the controller 41, the bird's-eye view video generation unit 45 generates the bird's-eye view video 100 on which a viewpoint conversion is performed such that the vehicle V1 is looked down from above, from the surrounding video acquired by the video data acquisition unit 42. The controller 41 then proceeds to step S14.

The controller 41 displays the bird's-eye view video 100 (step S14). More specifically, in the controller, the display controller 49 displays the bird's-eye view video 100 in the display panel 31. The controller 41 then proceeds to step S15.

The controller 41 determines whether to finish displaying the bird's-eye view video (step S15). More specifically, based on an end trigger, the controller 41 determines whether to finish displaying the bird's-eye view video 100. For example, the end trigger is generated when a predetermined time has elapsed since the bird's-eye view video 100 is displayed, or when the speed of the vehicle V1 becomes equal to or more than a threshold. For example, the end trigger may also be generated when a predetermined time has elapsed since the bird's-eye view video 100 was displayed and the vehicle V1 was stopped. In other words, for example, the end trigger may also be generated when a predetermined time has elapsed since the bird's-eye view video 100 was displayed and the vehicle V1 was stopped, and no operation is performed on the vehicle V1. When the end trigger is detected, the controller 41 determines to finish displaying the bird's-eye view video 100 (Yes at step S15), and finishes the processes. When no end trigger is detected, the controller 41 determines not to finish displaying the bird's-eye view video 100 (No at step S15), and executes the process at step S13 again.

In this manner, when it is determined that the other vehicle V3 the direction indicator of which is turned ON is located, the bird's-eye view video generation system 1 outputs a video signal to display the bird's-eye view video 100 on the display panel 31. For example, based on the video signal output from the bird's-eye view video generation system 1, the display panel 31 displays the bird's-eye view video 100 with a navigation screen.

As described above, in the present embodiment, when it is determined that the other vehicle V3 the direction indicator of which is turned ON is located, the bird's-eye view video 100 is displayed in the display panel 31. Consequently, with the present embodiment, the bird's-eye view video 100 can allow the driver to easily identify a relative positional relationship between the vehicle V1 and the surrounding vehicle of the vehicle V1. In this manner, in the present embodiment, the vehicle surroundings can be displayed in a confirmable manner.

Unlike the present embodiment, when the bird's-eye view video 100 is not displayed even when the other vehicle V3 the direction indicator of which is turned ON is located, the driver may not be able to identify the distance between the vehicle V1 and the surrounding vehicle of the vehicle V1. Consequently, as illustrated in FIG. 2, the vehicle V1 may be stopped at a stop position blocking the route of the other vehicle V3. In this case, for example, the other vehicle V3 that intends to pass behind the vehicle V1 from the opposite lane cannot proceed until the vehicle V1 moves forward. Thus, the vehicles following the other vehicle V3 may be congested, and the smooth traffic of the opposite lane may be prevented.

On the other hand, with the present embodiment, the bird's-eye view video 100 as illustrated in FIG. 3 is displayed. Thus, the driver can confirm that the distance between the vehicle V1 and the preceding vehicle V2 is long. Through the bird's-eye view video 100, the driver can determine that the route of the other vehicle V3 can be secured by moving the vehicle V1 forward and reducing the distance between the vehicle V1 and the preceding vehicle V2. In this manner, with the present embodiment, through the bird's-eye view video 100, it is possible to allow the other vehicle V3 to pass through smoothly. Moreover, with the present embodiment, it is possible to prevent the vehicles following the other vehicle V3 from being congested.

Second Embodiment

Figure 5:
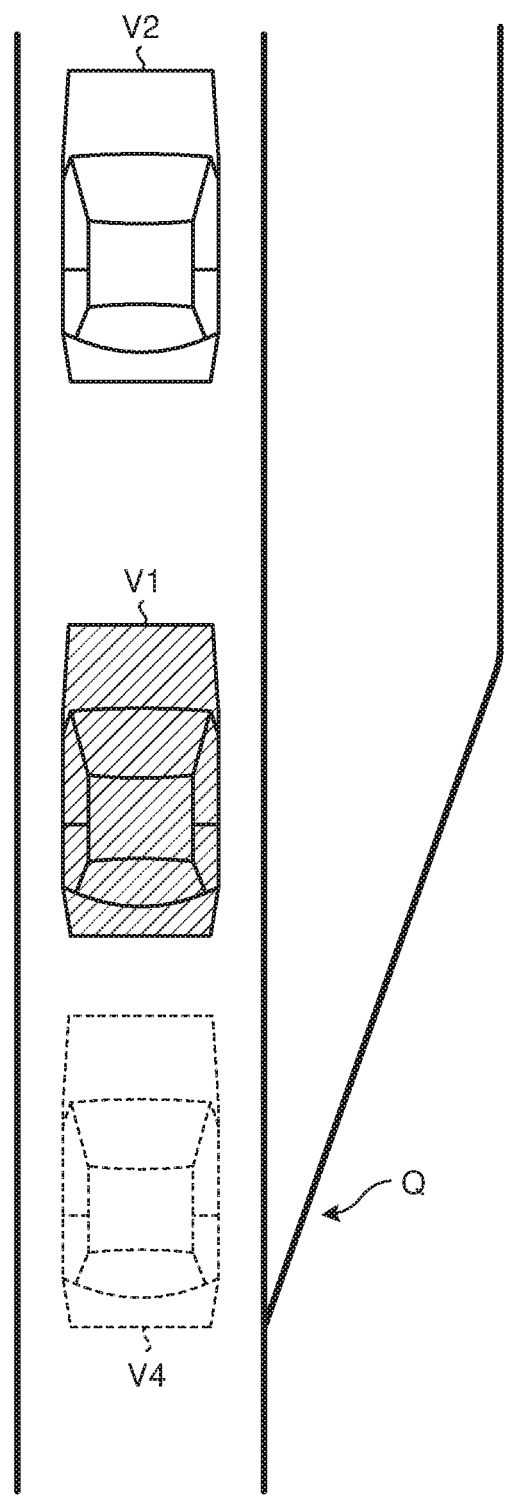
FIG. 5 is a diagram for explaining a bird's-eye view video generation system according to a second embodiment, and illustrates a vehicle and the surroundings thereof.
Figure 6:
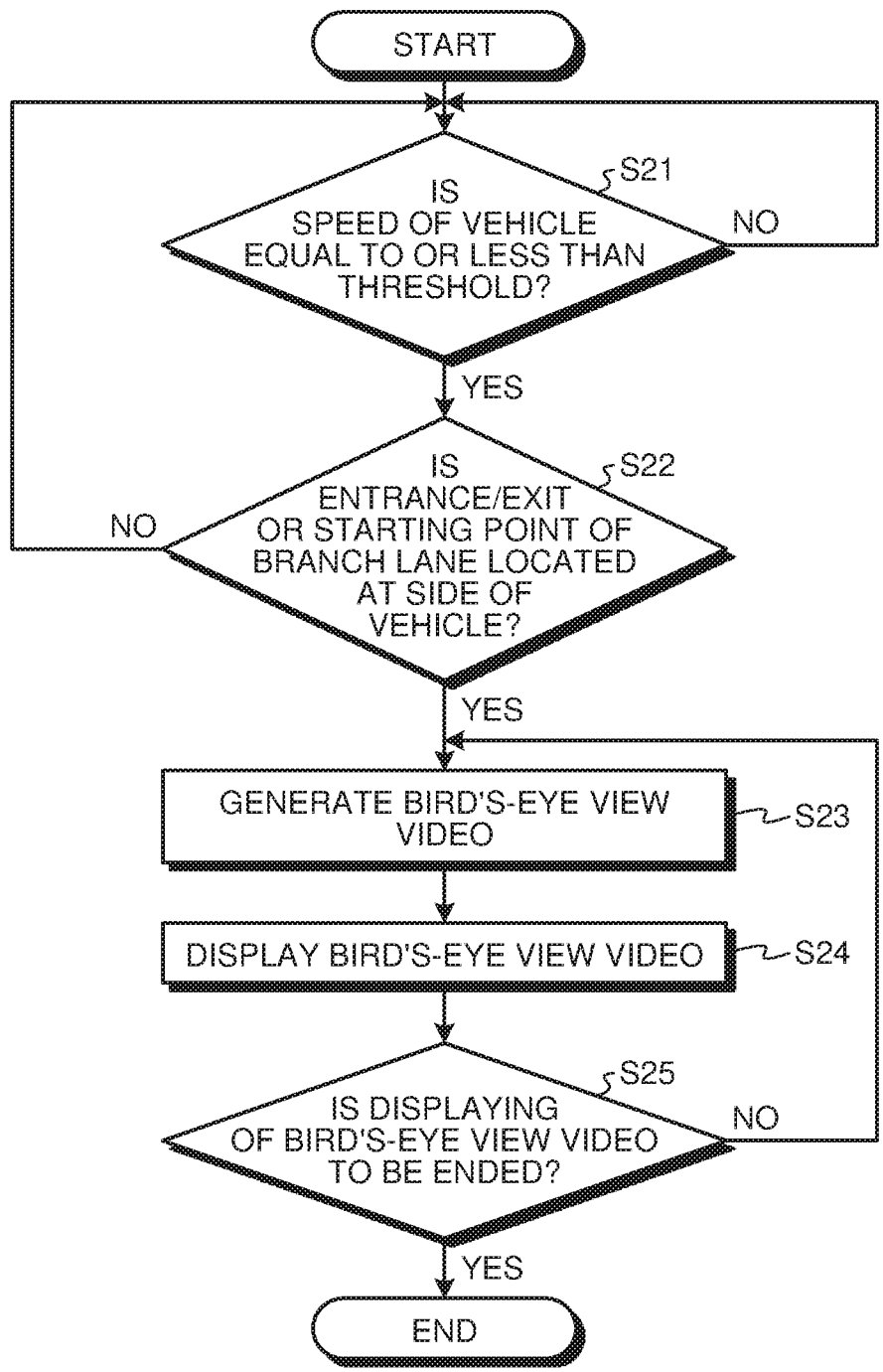
FIG. 6 is a flowchart illustrating a flow of processes performed by a bird's-eye view video generation device of the bird's-eye view video generation system according to the second embodiment.

The bird's-eye view video generation system 1 according to the present embodiment will now be described with reference to FIG. 5 and FIG. 6. FIG. 5 is a diagram for explaining a bird's-eye view video generation system according to a second embodiment, and illustrates a vehicle and the surroundings thereof. FIG. 6 is a flowchart illustrating a flow of processes performed by a bird's-eye view video generation device of the bird's-eye view video generation system according to the second embodiment. The basic configuration of the bird's-eye view video generation system 1 is the same as that of the bird's-eye view video generation system 1 in the first embodiment. In the following description, the same components as those in the bird's-eye view video generation system 1 are indicated by the same reference numerals or corresponding reference numerals, and the detailed description thereof will be omitted.

In the present embodiment, based on the surrounding information and the vehicle information, when an entrance/exit into/from which a vehicle can enter or exit, or a starting point Q of a branch lane is located at the side of the vehicle V1, the bird's-eye view video generation system 1 generates and displays the bird's-eye view video 100. In the bird's-eye view video generation system 1 of the present embodiment, the processes performed by the surrounding information acquisition unit 43, the bird's-eye view video generation unit 45, and the display controller 49 are different from those performed by the surrounding information acquisition unit 43, the bird's-eye view video generation unit 45, and the display controller 49 in the first embodiment.

The entrance/exit is a location into/from which the other vehicle V3 may enter or exit by moving across the front of or behind the vehicle V1. For example, the entrance/exit is an entrance/exit of a parking lot or an entrance/exit of an alley. In such a location, when the vehicle V1 is stopped at a position blocking the entrance/exit, the other vehicle V3 may not be able to smoothly enter into or exit from the entrance/exit.

The starting point Q of the branch lane is a location where the traffic lane is branched. For example, the starting point Q of the branch lane is a location where a branch lane as a right-turn lane or a left-turn lane is branched.

The surrounding information acquisition unit 43 executes an imaging process on the surrounding video acquired by the video data acquisition unit 42, detects an entrance/exit or a starting point Q of the branch lane at the side of the vehicle V1, and sets the detection result as surrounding information. For example, in the surrounding video captured by at least one of the rear camera 12, the left side camera 13, and the right side camera 14, the surrounding information acquisition unit 43 detects a location where a gap is provided in a guardrail or a curb at the side of the vehicle V1 as the entrance/exit. For example, in the surrounding video captured by at least one of the rear camera 12, the left side camera 13, and the right side camera 14, the surrounding information acquisition unit 43 detects a location where a sign indicating an entrance to a parking lot is provided at the side of the vehicle V1 as the entrance/exit. For example, in the surrounding video captured by at least one of the rear camera 12, the left side camera 13, and the right side camera 14, the surrounding information acquisition unit 43 detects the starting point Q of the branch lane such as a left-turn lane or a right-turn lane at the side of the vehicle V1. The surrounding information acquisition unit 43 outputs the detection result of the entrance/exit or the starting point Q of the branch lane to the bird's-eye view video generation unit 45, as surrounding information.

The surrounding information acquisition unit 43 may also detect an object to be captured having a linearity of equal to or more than a predetermined length from the surrounding video as a guardrail or a curb using an edge detection process, and detect a gap in the guardrail or the curb. The surrounding information acquisition unit 43 may also detect a gap in a guardrail or a curb from the surrounding video, using a recognition dictionary in which a gap in the guardrail or curb is stored.

Alternatively, the surrounding information acquisition unit 43 may also detect an entrance/exit or a starting point Q of the branch lane from map information of a navigation system, which is not illustrated, and a current position information of the vehicle V1.

Based on the surrounding information and the vehicle information, when an entrance/exit or a starting point Q of the branch lane is located at the side of the vehicle V1, the bird's-eye view video generation unit 45 determines that the distance between the vehicle V1 and the surrounding vehicle of the vehicle V1 should be confirmed, and generates the bird's-eye view video 100.

Based on the surrounding information and the vehicle information, when an entrance/exit or a starting point Q of the branch lane is located at the side of the vehicle V1, the display controller 49 determines that the distance between the vehicle V1 and the surrounding vehicle of the vehicle V1 should be confirmed, and displays the bird's-eye view video 100 on the display panel 31.

Next, a flow of processes performed by the bird's-eye view video generation device 40 will be described with reference to FIG. 6. The processes at step S21 and from step S23 to step S25 in the flowchart illustrated in FIG. 6 are performed similar to the processes at step S11 and from step S13 to step S15 in the flowchart illustrated in FIG. 4.

The controller 41 determines whether an entrance/exit or a starting point Q of the branch lane is located at the side of the vehicle V1 (step S22). More specifically, in the controller 41, the surrounding information acquisition unit 43 detects an entrance/exit or a starting point Q of the branch lane at the side of the vehicle V1, from the surrounding video acquired by the video data acquisition unit 42, and sets the detection result as surrounding information. When it is determined that an entrance/exit or a the starting point Q of the branch lane is located at the side of the vehicle V1 based on the surrounding information acquired by the surrounding information acquisition unit 43 (Yes at step S22), the controller 41 proceeds to step S23. When it is determined that no entrance/exit or no starting point Q of the branch lane is located at the side of the vehicle V1 based on the surrounding information acquired by the surrounding information acquisition unit 43 (No at step S22), the controller 41 executes the process at step S21 again.

As described above, when an entrance/exit or a starting point Q of the branch lane is located at the side of the vehicle V1, in the present embodiment, the bird's-eye view video 100 can be generated. With the present embodiment, when the vehicle V1 is stopped at the side of the entrance/exit or the starting point Q of the branch lane, it is possible to allow the driver to easily identify a relative positional relationship between the vehicle V1 and the surrounding vehicle of the vehicle V1. In this manner, in the present embodiment, the vehicle surroundings can be displayed in a confirmable manner.

Unlike the present embodiment, when the bird's-eye view video 100 is not displayed even when is located an entrance/exit part or a starting point Q of the branch lane is located at the side of the vehicle V1, the driver may not be able to identify the distance between the vehicle V1 and the surrounding vehicle of the vehicle V1. Consequently, as illustrated in FIG. 5, the vehicle V1 may be stopped at the stop position blocking the starting point Q of the branch lane. In this case, even when a following vehicle V4, which is illustrated by a broken line, intends to enter the right-turn lane from the starting point Q of the branch lane, the following vehicle V4 cannot proceed until the vehicle V1 moves forward. Consequently, the vehicles following the following vehicle V4 may be congested, and the smooth traffic may be prevented.

On the other hand, with the present embodiment, through the bird's-eye view video 100, the driver can determine that the route of the following vehicle V4 can be secured by moving the vehicle V1 forward and reducing the distance between the vehicle V1 and the preceding vehicle V2. In this manner, with the present embodiment, through the bird's-eye view video 100, it is possible to allow the following vehicle V4 to pass through smoothly. Moreover, with the present embodiment, it is possible to prevent the vehicles following the following vehicle V4 from being congested.

Third Embodiment

Figure 7:
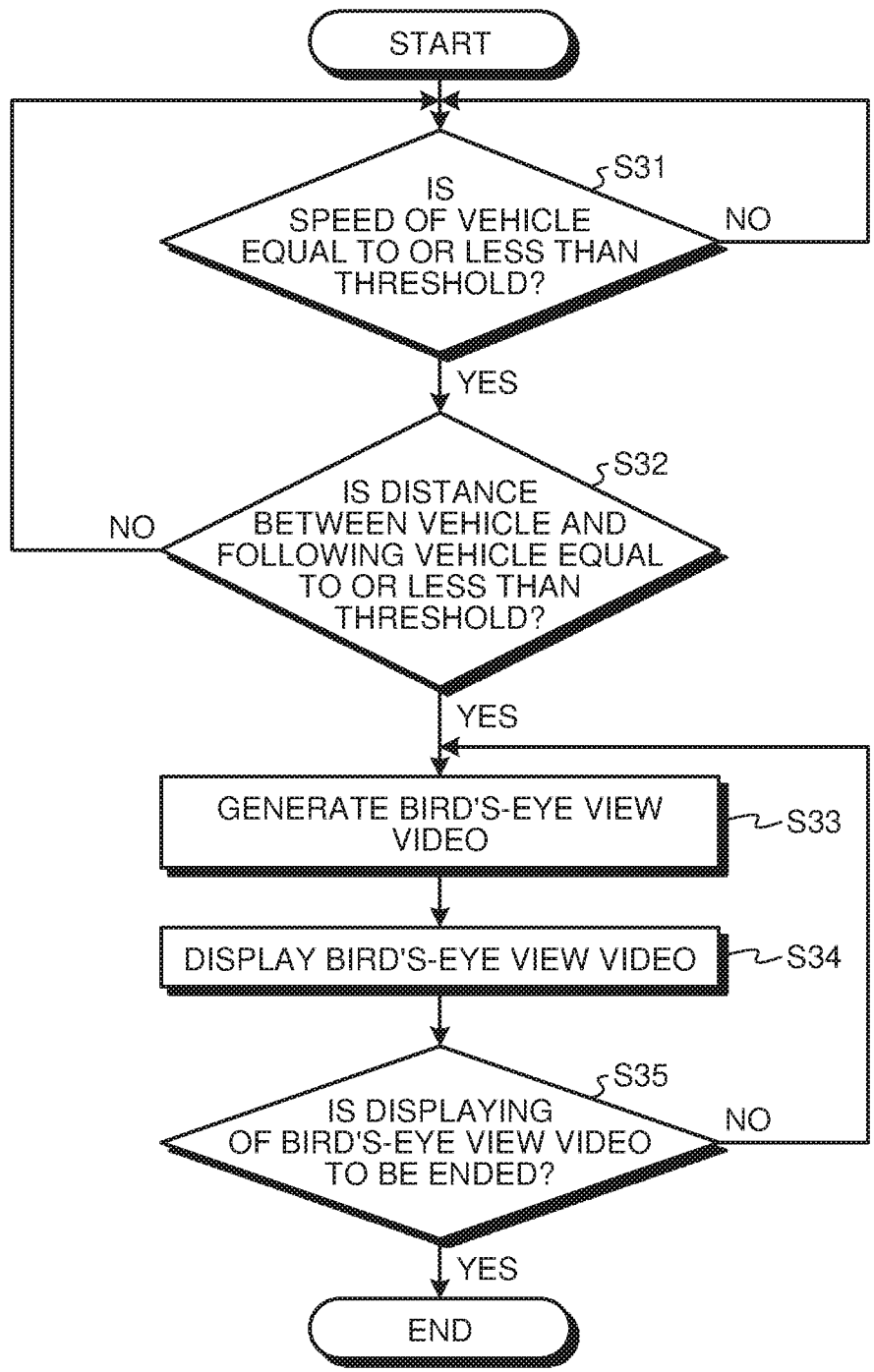
FIG. 7 is a flowchart illustrating a flow of processes performed by a bird's-eye view video generation device of a bird's-eye view video generation system according to a third embodiment.

The bird's-eye view video generation system 1 according to the present embodiment will now be described with reference to FIG. 7. FIG. 7 is a flowchart illustrating a flow of processes performed by a bird's-eye view video generation device of a bird's-eye view video generation system according to a third embodiment.

In the present embodiment, based on the surrounding information and the vehicle information, when the distance between the vehicle V1 and the following vehicle is equal to or less than a threshold, the bird's-eye view video generation system 1 generates and displays the bird's-eye view video 100. In the bird's-eye view video generation system 1 of the present embodiment, the processes performed by the surrounding vehicle information acquisition unit 431 of the surrounding information acquisition unit 43, the bird's-eye view video generation unit 45, and the display controller 49 are different from those performed by the surrounding information acquisition unit 43, the bird's-eye view video generation unit 45, and the display controller 49 in the first embodiment. For example, the following vehicle is a vehicle located at a reduced distance from the vehicle V1 to move to the branch lane, but cannot move forward from the position to be stopped.

The surrounding vehicle information acquisition unit 431 acquires the distance between the vehicle V1 and the following vehicle as surrounding vehicle information. The surrounding vehicle information acquisition unit 431 acquires the distance between the vehicle V1 and the following vehicle from the rear camera 12 or various sensors that detect the distance between the vehicle V1 and the following vehicle.

Based on the surrounding information and the vehicle information, when the distance between the vehicle V1 and the following vehicle is equal to or less than a threshold, the bird's-eye view video generation unit 45 determines that the distance between the vehicle V1 and the preceding vehicle V2 should be confirmed, and generates the bird's-eye view video 100.

Based on the surrounding information and the vehicle information, when the distance between the vehicle V1 and the following vehicle is equal to or less than a threshold, the display controller 49 determines that the distance between the vehicle V1 and the preceding vehicle V2 should be confirmed, and displays the bird's-eye view video 100 on the display panel 31.

Next, with reference to FIG. 7, a flow of processes performed by the bird's-eye view video generation device 40 will be described. The processes at step S31 and from step S33 to step S35 in the flowchart illustrated in FIG. 7 are performed similar to the processes at step S11 and from step S13 to step S15 in the flowchart illustrated in FIG. 4.

The controller 41 determines whether the distance between the vehicle V1 and the following vehicle is equal to or less than a threshold (step S32). More specifically, in the controller 41, the surrounding vehicle information acquisition unit 431 acquires the surrounding vehicle information including the distance between the vehicle V1 and the following vehicle. When it is determined that the distance between the vehicle V1 and the following vehicle is equal to or less than a threshold based on the surrounding information acquired by the surrounding information acquisition unit 43 (Yes at step S32), the controller 41 proceeds to step S33. When it is determined that the distance between the vehicle V1 and the following vehicle is not equal to or less than a threshold (No at step S32), the controller 41 executes the process at step S31 again.

As described above, when the distance between the vehicle V1 and the following vehicle is equal to or less than a threshold, in the present embodiment, the bird's-eye view video 100 can be generated. With the present embodiment, when the distance between the vehicle V1 and the following vehicle is equal to or less than a threshold, it is possible to allow the driver to easily identify a relative positional relationship between the vehicle V1 and the preceding vehicle V2. In this manner, in the present embodiment, the vehicle surroundings can be displayed in a confirmable manner.

With the present embodiment, through the bird's-eye view video 100, the driver can determine that the route of the following vehicle V4 can be secured by moving the vehicle V1 forward and reducing the distance between the vehicle V1 and the preceding vehicle V2. In this manner, with the present embodiment, through the bird's-eye view video 100, it is possible to allow the following vehicle V4 to pass through smoothly. Moreover, with the present embodiment, it is possible to prevent the vehicles following the following vehicle V4 from being congested.

Fourth Embodiment

Figure 8:
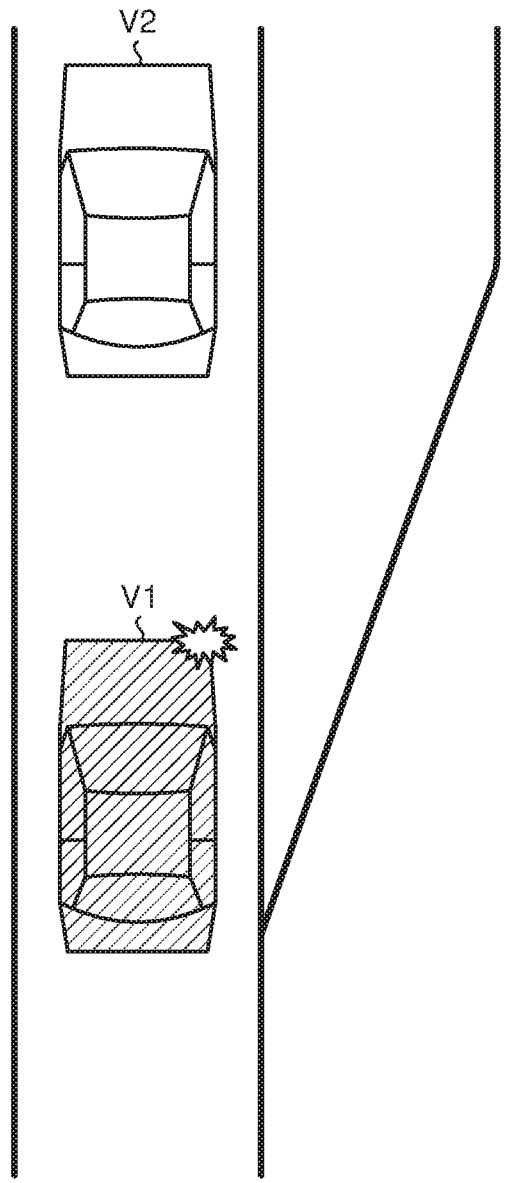
FIG. 8 is a diagram for explaining a bird's-eye view video generation system according to a fourth embodiment, and illustrates a vehicle and the surroundings thereof.
Figure 9:
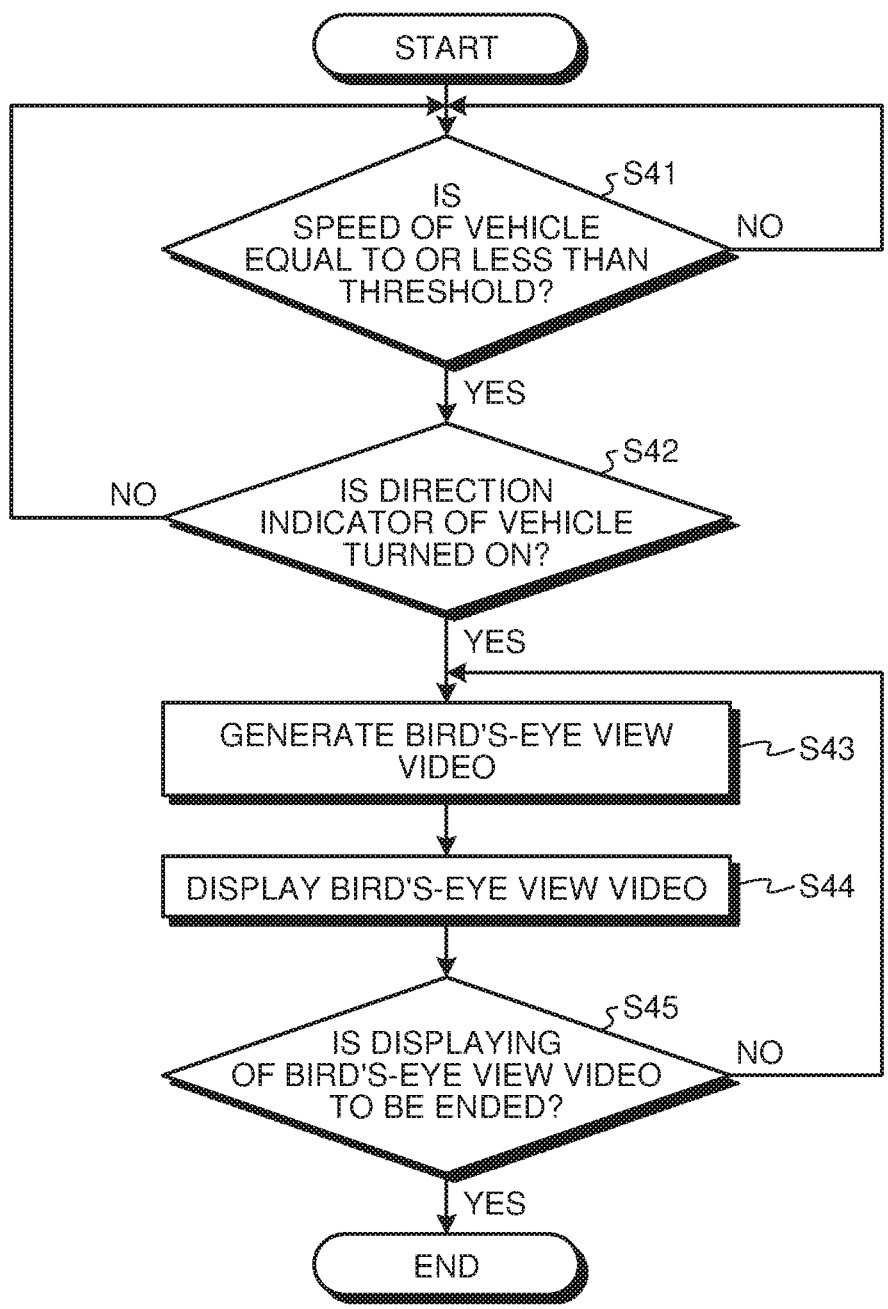
FIG. 9 is a flowchart illustrating a flow of processes performed by a bird's-eye view video generation device of the bird's-eye view video generation system according to the fourth embodiment.

The bird's-eye view video generation system 1 according to the present embodiment will now be described with reference to FIG. 8 and FIG. 9. FIG. 8 is a diagram for explaining a bird's-eye view video generation system according to a fourth embodiment, and illustrates a vehicle and the surroundings thereof. FIG. 9 is a flowchart illustrating a flow of processes performed by a bird's-eye view video generation device of the bird's-eye view video generation system according to the fourth embodiment.

In the present embodiment, based on the vehicle information, when the direction indicator of the vehicle V1 is turned ON, the bird's-eye view video generation system 1 generates and displays the bird's-eye view video 100. In the bird's-eye view video generation system 1 of the present embodiment, the processes performed by the bird's-eye view video generation unit 45 and the display controller 49 are different from those performed by the bird's-eye view video generation unit 45 and the display controller 49 in the first embodiment.

Based on the vehicle information, when the direction indicator of the vehicle V1 is turned ON, the bird's-eye view video generation unit 45 determines that the distance between the vehicle V1 and the preceding vehicle V2 should be confirmed, and generates the bird's-eye view video 100.

Based on the vehicle information, when the direction indicator of the vehicle V1 is turned ON, the display controller 49 determines that the distance between the vehicle V1 and the preceding vehicle V2 should be confirmed, and displays the bird's-eye view video 100 on the display panel 31.

Next, a flow of processes performed by the bird's-eye view video generation device 40 will be described with reference to FIG. 9. The processes at step S41 and from step S43 to step S45 in the flowchart illustrated in FIG. 9 are performed similar to the processes at step S11 and from step S13 to step S15 in the flowchart illustrated in FIG. 4.

The controller 41 determines whether the direction indicator of the vehicle V1 is turned ON (step S42). More specifically, when it is determined that the direction indicator of the vehicle V1 is turned ON based on the vehicle information acquired by the vehicle information acquisition unit 44 (Yes at step S42), the controller 41 proceeds to step S43. When it is determined that the direction indicator of the vehicle V1 is not turned ON based on the vehicle information acquired by the vehicle information acquisition unit 44 (No at step S42), the controller 41 executes the process at step S41 again.

As described above, when it is determined that the direction indicator of the vehicle V1 is turned ON, in the present embodiment, the bird's-eye view video 100 is displayed in the display panel 31. Consequently, with the present embodiment, it is possible to allow the driver to easily identify a relative positional relationship between the vehicle V1 and the preceding vehicle V2. In this manner, in the present embodiment, the vehicle surroundings can be displayed in a confirmable manner.

With the present embodiment, through the bird's-eye view video 100, the driver can grasp the distance between the vehicle V1 and the preceding vehicle V2. Consequently, the driver can determine that the route of the vehicle V1 can be secured and the lane thereof can be changed at the starting point of the branch lane by moving the vehicle V1 forward while confirming the distance between the vehicle V1 and the preceding vehicle V2. In this manner, with the present embodiment, it is possible to allow the vehicle V1 to pass through smoothly.

Fifth Embodiment

Figure 11:
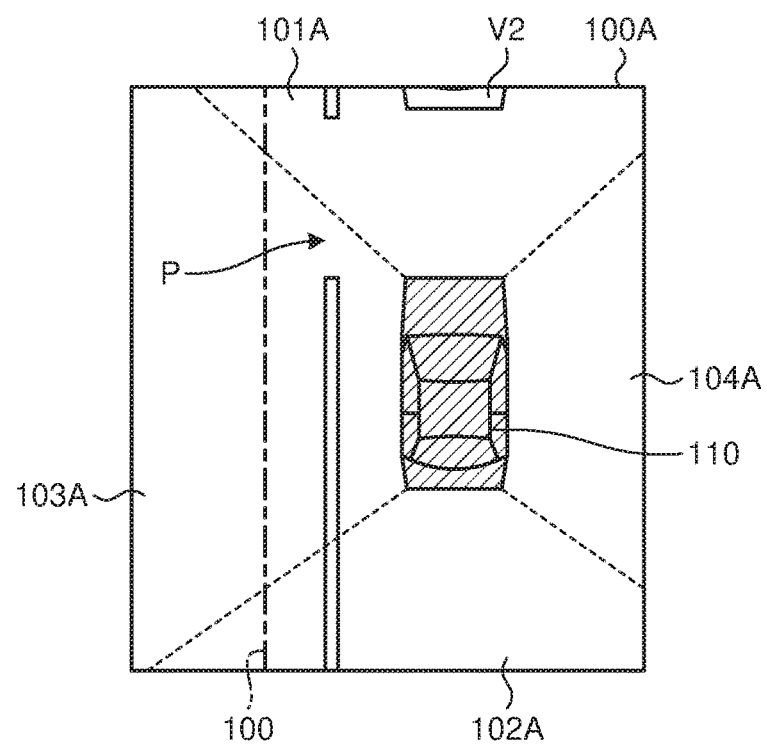
FIG. 11 is a diagram illustrating an example of bird's-eye view video generated by a bird's-eye view video generation system according to a fifth embodiment.

The bird's-eye view video generation system 1 according to the present embodiment will now be described with reference to FIG. 11. FIG. 11 is a diagram illustrating an example of bird's-eye view video generated by a bird's-eye view video generation system according to a fifth embodiment. The basic configuration of the bird's-eye view video generation system 1 is the same as that of the bird's-eye view video generation system 1 in the first embodiment. In the following description, the same components as those in the bird's-eye view video generation system 1 are indicated by the same reference numerals or corresponding reference numerals, and the detailed description thereof will be omitted. In the bird's-eye view video generation system 1 of the present embodiment, processes performed by the bird's-eye view video generation unit 45 are different from those performed by the bird's-eye view video generation unit 45 in the first embodiment.

The bird's-eye view video generation unit 45 generates bird's-eye view video 100A in which a display area of the surrounding video that includes an entrance/exit P or the starting point Q of the branch lane is enlarged. In the present embodiment, the bird's-eye view video generation unit 45 generates the bird's-eye view video 100A in which the display area of a left side video 103A that includes the entrance/exit part P or the starting point Q of the branch lane, a left side of a display area of a front video 101A, and a left side of a display area of a rear video 102A are enlarged. A display area of a right side video 104A is the same as that of a normal bird's-eye view video 100.

More specifically, by enlarging the imaging areas of the cameras which capture video in a direction of the entrance/exit P or the starting point Q of the branch lane, the controller 41 may generate the bird's-eye view video 100A in which the display area of the surrounding video that includes the entrance/exit P or the starting point Q of the branch lane is enlarged. In this case, the controller 41 causes the left side camera 13, the front camera 11, and the rear camera 12 to capture video of the third imaging area A3, the first imaging area A1, and the second imaging area A2, respectively, while enlarging the third imaging area A3, the first imaging area A1, and the second imaging area A2 in the left direction. Then, in the controller 41, the viewpoint conversion processor 451 performs a viewpoint conversion process on the surrounding video data captured by the cameras. Then, in the controller 41, the clipping processor 452 performs a clipping process of clipping the left side video 103A, the front video 101A, and the rear video 102A each of which is wider than the normal one, and clipping the right side video 104A which is the same as the normal one, from the surrounding video data on which the viewpoint conversion process is performed, according to the imaging area of each direction. Then, in the controller 41, the synthesizing processor 453 performs a synthesis process of synthesizing video data on which the clipping process is performed. In this manner, the controller 41 generates the bird's-eye view video 100A in which the display area of the surrounding video that includes the entrance/exit P or the starting point Q of the branch lane is enlarged.

Alternatively, by clipping the surrounding video obtained by capturing video in the direction of the entrance/exit P or the starting point Q of the branch lane in a larger clipping area, the controller 41 may generate the bird's-eye view video 100A in which the display area of the surrounding video that includes the entrance/exit P or the starting point Q of the branch lane is enlarged. In this case, in the controller 41, the clipping processor 452 performs a clipping process of clipping the left side video 103A, the front video 101A, and the rear video 102A each of which is larger than the normal one, and clipping the right side video 104A which is the same as the normal one, from the surrounding video data on which the viewpoint conversion process is performed. Then, in the controller 41, the synthesizing processor 453 performs a synthesis process of synthesizing video data on which the clipping process is performed. In this manner, the controller 41 generates the bird's-eye view video 100A in which the display area of the surrounding video that includes the entrance/exit P or the starting point Q of the branch is enlarged.

The bird's-eye view video 100A will now be described with reference to FIG. 11. The left side of the bird's-eye view video 100A is generated larger than that of the normal bird's-eye view video 100 illustrated by a dashed line. For example, in the bird's-eye view video 100A, an area of about 2 meters from the vehicle V1 is displayed in the front, the rear, and the right side, and an area of about 5 meters from the vehicle V1 is displayed in the left side. The bird's-eye view video 100A allows the driver to identify a relative positional relationship between the vehicle V1 and the entrance/exit P.

As described above, in the present embodiment, the bird's-eye view video 100A in which the display area of the surrounding video that includes the entrance/exit P or the starting point Q of the branch lane is enlarged can be displayed. With the present embodiment, by displaying the bird's-eye view video 100A such as the above, the driver can easily identify the entrance/exit part or the starting point Q of the branch lane. In the present embodiment, the vehicle surroundings can be displayed in a confirmable manner.

Sixth Embodiment

Figure 12:
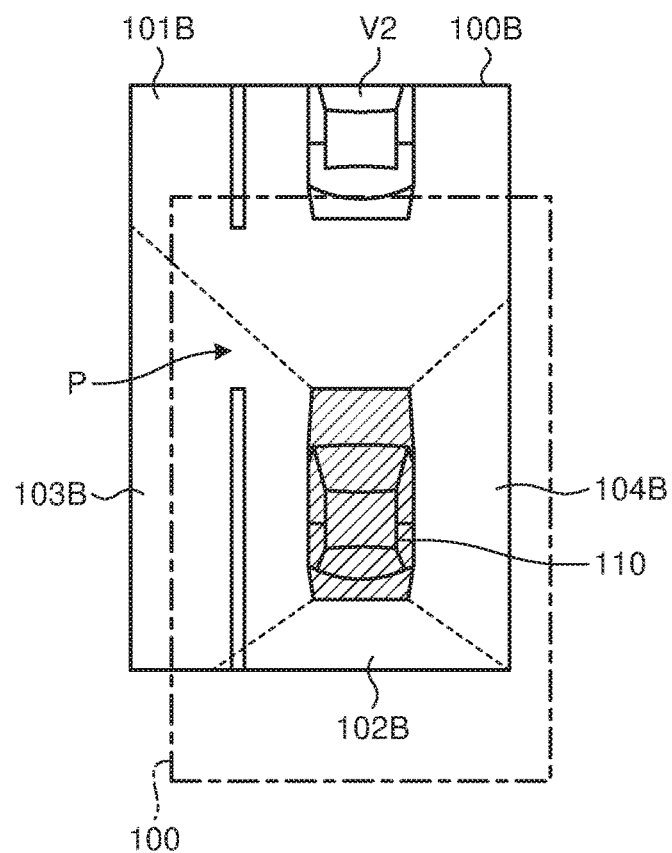
FIG. 12 is a diagram illustrating an example of bird's-eye view video generated by a bird's-eye view video generation system according to a sixth embodiment.

The bird's-eye view video generation system 1 according to the present embodiment will now be described with reference to FIG. 12. FIG. 12 is a diagram illustrating an example of bird's-eye view video generated by a bird's-eye view video generation system according to a sixth embodiment. In the bird's-eye view video generation system 1 of the present embodiment, the processes performed by the bird's-eye view video generation unit 45 are different from those performed by the bird's-eye view video generation unit 45 in the fifth embodiment.

The bird's-eye view video generation unit 45 generates bird's-eye view video 100B in which a display area A is shifted such that the side of the entrance/exit P or the starting point Q of the branch lane is displayed relatively widely. In the present embodiment, the bird's-eye view video generation unit 45 generates the bird's-eye view video 100B in which the display area A is shifted toward the left front side such that a left side video 103B and a front video 101B that includes the entrance/exit P or the starting point Q of the branch lane are displayed relatively widely. A rear video 102B and a right side video 104B are smaller than those in the normal bird's-eye view video 100.

In the controller 41, the clipping processor 452 performs a clipping process of clipping the left side video 103B and the front video 101B each of which is wider than the normal one in the left front side, and clipping the rear video 102B and the right side video 104B each of which is smaller than the normal one, from the surrounding video data on which the viewpoint conversion process is performed. Then, in the controller 41, the synthesizing processor 453 performs a synthesis process of synthesizing the video data on which the clipping process is performed. In this manner, the controller 41 generates the bird's-eye view video 100B in which the display area A is shifted such that the entrance/exit P or the starting point Q of the branch lane is displayed relatively widely.

The bird's-eye view video 100B will now be described with reference to FIG. 12. The bird's-eye view video 100B is generated such that the display area A of the normal bird's-eye view video 100 illustrated by the dashed line in FIG. 12 is shifted toward the left front side. The bird's-eye view video 100B allows the driver to identify a relative positional relationship between the vehicle V1 and the entrance/exit P.

As described above, in the present embodiment, the bird's-eye view video 100B in which the display area A is shifted toward the side of the entrance/exit P or the starting point Q of the branch lane can be generated. With the present embodiment, by displaying the bird's-eye view video 100B such as the above, the driver can easily identify the entrance/exit P or the starting point Q of the branch lane. In the present embodiment, the vehicle surroundings can be displayed in a confirmable manner.

Seventh Embodiment

Figure 13:
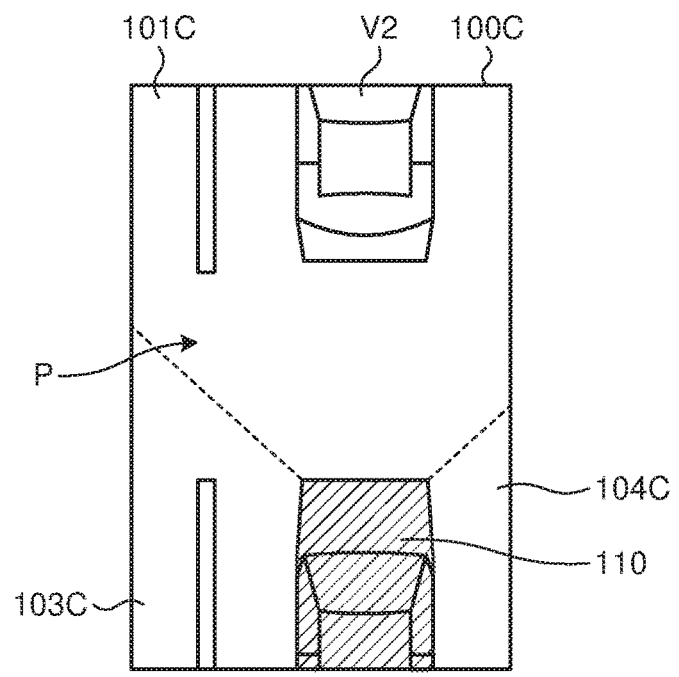
FIG. 13 is a diagram illustrating an example of bird's-eye view video generated by a bird's-eye view video generation system according to a seventh embodiment.

The bird's-eye view video generation system 1 according to the present embodiment will now be described with reference to FIG. 13. FIG. 13 is a diagram illustrating an example of bird's-eye view video generated by a bird's-eye view video generation system according to a seventh embodiment. In the bird's-eye view video generation system 1 of the present embodiment, the processes performed by the bird's-eye view video generation unit 45 are different from those performed by the bird's-eye view video generation unit 45 in the fifth embodiment.

The bird's-eye view video generation unit 45 generates bird's-eye view video 100C in which the display area A is changed such that the entrance/exit Q or the starting point Q of the branch lane is displayed in an enlarged manner. In the present embodiment, the bird's-eye view video generation unit 45 generates the bird's-eye view video 100C in which the display area A is changed such that a front of a left side video 103C and a left side of a front video 101C displaying the entrance/exit P or the starting point Q of the branch lane are enlarged.

In the controller 41, the clipping processor 452 performs a clipping process of clipping the bird's-eye view video 100C such that the left front side is enlarged from the surrounding video data on which the viewpoint conversion process is performed. Then, in the controller 41, the synthesizing processor 453 performs a synthesis process of synthesizing the video data on which the clipping process is performed.

The bird's-eye view video 100C will now be described with reference to FIG. 13. The bird's-eye view video 100C is generated such that the left front side is enlarged. The bird's-eye view video 100C allows the driver to identify a relative positional relationship between the vehicle V1 and the entrance/exit P.

As described above, in the present embodiment, the bird's-eye view video 100C in which the entrance/exit P or the starting point Q of the branch lane is enlarged can be generated. With the present embodiment, by displaying the bird's-eye view video 100C such as the above, the driver can easily identify the entrance/exit P or the starting point Q of the branch lane. In the present embodiment, the vehicle surroundings can be displayed in a confirmable manner.

Eighth Embodiment

Figure 14:
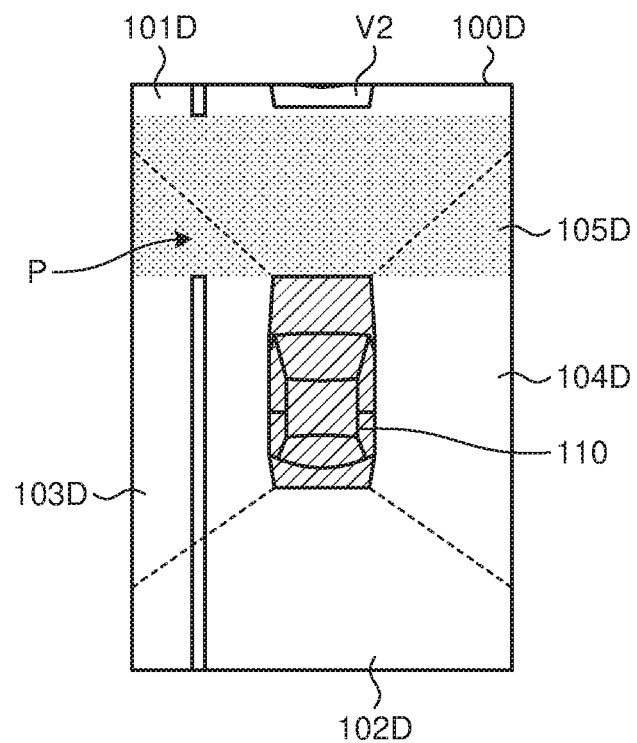
FIG. 14 is a diagram illustrating an example of bird's-eye view video generated by a bird's-eye view video generation system according to an eighth embodiment.

The bird's-eye view video generation system 1 according to the present embodiment will now be described with reference to FIG. 14. FIG. 14 is a diagram illustrating an example of bird's-eye view video generated by a bird's-eye view video generation system according to an eighth embodiment. In the bird's-eye view video generation system 1 of the present embodiment, the processes performed by the bird's-eye view video generation unit 45 are different from those performed by the bird's-eye view video generation unit 45 in the fifth embodiment.

The bird's-eye view video generation unit 45 generates bird's-eye view video 100D in which an area of the entrance/ exit part P or the starting point Q of the branch lane is highlighted. In the present embodiment, the bird's-eye view video generation unit 45 generates the bird's-eye view video 100D by synthesizing an entrance/exit icon 105D that highlights the entrance/exit P or the starting point Q of the branch lane on the bird's-eye view video synthesized by the synthesizing processor 453.

The bird's-eye view video 100D will now be described with reference to FIG. 14. The bird's-eye view video 100D includes the entrance/exit icon 105D that highlights a width of the entrance/exit P. The entrance/exit icon 105D is a belt-shaped icon corresponding to the width of the entrance/exit P.

As described above, in the present embodiment, the bird's-eye view video 100D in which the area of the entrance/exit P or the starting point Q of the branch lane is highlighted. With the present embodiment, by displaying the bird's-eye view video 100D such as the above, the driver can easily identify the entrance/exit P or the starting point Q of the branch lane. In the present embodiment, the vehicle surroundings can be displayed in a confirmable manner.

While the bird's-eye view video generation system 1 according to the present application has been described, it is to be understood that various other modifications may be made in addition to the embodiments described above.

The components of the bird's-eye view video generation system 1 illustrated in the drawings are functionally conceptual, and need not necessarily be physically configured as illustrated in the drawings. In other words, the specific modes of the devices are not limited to those illustrated in the drawings, and all or a part of the devices may be functionally or physically distributed or integrated in arbitrary units according to the processing load, the usage state, or the like.

For example, the configuration of the bird's-eye view video generation system 1 is implemented by a computer program and the like loaded in memory as software. The embodiments described above depict functional blocks implemented by cooperation of hardware and software. Therefore, it will be obvious to those skilled in the art that the functional blocks may be implemented by a variety of manners including hardware only, software only, or a combination of hardware and software.

The components described above include components that can be easily conceived by those skilled in the art, or components substantially the same as the components. Moreover, the components described above may be combined with one another as appropriate. Furthermore, various omissions, replacements, or changes may be made without departing from the spirit of the present application.

Based on the surrounding information and the vehicle information, when the vehicle V1 is positioned at a side of a bus stop, the bird's-eye view video generation system 1 may generate and display the bird's-eye view video 100. Based on the surrounding information acquired by the surrounding information acquisition unit 43 and the vehicle information acquired by the vehicle information acquisition unit 44, when it is determined that is located a bus stop is located at the side of the vehicle V1, the bird's-eye view video generation unit 45 may generate the bird's-eye view video 100. Based on the surrounding information and the vehicle information, when it is determined that a bus stop is located at the side of the vehicle V1, the display controller 49 may display the bird's-eye view video 100 on the display panel 31. Consequently, through the bird's-eye view video 100, the driver of the vehicle V1 can prevent the vehicle V1 from stopping at the side of the bus stop and blocking a passage of a bus.

In the first embodiment, the bird's-eye view video generation unit 45 may generate the bird's-eye view video 100 and the display controller 49 may display the bird's-eye view video 100 on the display panel 31 only when it is determined that the other vehicle V3 can pass through by the vehicle V1 moving forward based on the surrounding information and the vehicle information, that is based on the distance between the vehicle V1 and the preceding vehicle V2 and a width of a road toward which the other vehicle V3 is intending to enter by changing the route.

For example, the first embodiment and the third embodiment may be combined. Based on the surrounding information and the vehicle information, when the direction indicator of the following vehicle V4 is turned ON and when the distance between the vehicle V1 and the following vehicle V4 is equal to or less than a threshold, the bird's-eye view video generation unit 45 may generate the bird's-eye view video 100, and the display controller 49 may display the bird's-eye view video 100 on the display panel 31.

For example, the first embodiment to the third embodiment may be combined. Based on the surrounding information and the vehicle information, when it is determined that the entrance/exit P is located at the side of the vehicle V1 and the other vehicle V3 the direction indicator of which is turned ON is located, the bird's-eye view video generation unit 45 may generate the bird's-eye view video 100, and the display controller 49 may display the bird's-eye view video 100 on the display panel 31.

Figure 10:
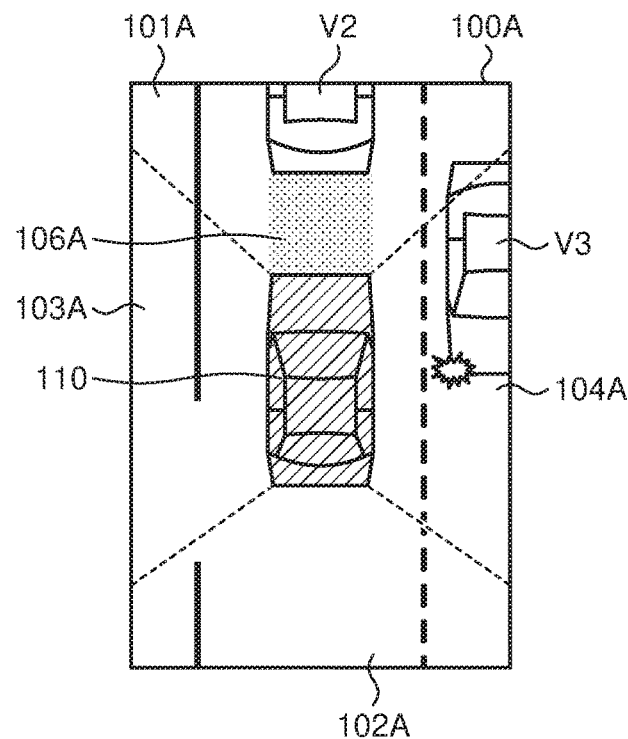
FIG. 10 is a diagram illustrating another example of bird's-eye view video generated by a bird's-eye view video generation system.

The bird's-eye view video generation unit 45 may generate the bird's-eye view video 100A in which the distance between the vehicle V1 and the surrounding vehicle around the vehicle V1 is highlighted. FIG. 10 is a diagram illustrating another example of bird's-eye view video generated by a bird's-eye view video generation system. The bird's-eye view video generation unit 45 may generate the bird's-eye view video 100A including a distance-between-vehicles highlighting icon 106A that highlights the distance between the vehicle V1 and the surrounding vehicle around the vehicle V1. Consequently, the distance between the vehicle V1 and the surrounding vehicle around the vehicle V1 can be displayed in an easily confirmable manner.

Based on the surrounding information and the vehicle information, when a sign of a restricted area or a no-stopping area is indicated on the road surface near the vehicle V1, the bird's-eye view video generation unit 45 may generate the bird's-eye view video 100, and the display controller 49 may display the bird's-eye view video 100 on the display panel 31. Consequently, it is possible to prevent the vehicle V1 or the following vehicle V4 from stopping in the restricted area or the no-stopping area.

The descriptions above are in the case in which the bird's-eye view video generation unit 45 generates the bird's-eye view video 100 when a predetermined condition is satisfied, but not limited thereto. The bird's-eye view video generation unit 45 may generate the bird's-eye view video 100 while the bird's-eye view video generation system 1 is being activated. In this case, based on the surrounding information indicating the state of surroundings acquired by the surrounding information acquisition unit 43 and the vehicle information acquired by the vehicle information acquisition unit 44, when it is determined that the distance between the vehicle V1 and the surrounding vehicle around the vehicle V1 should be confirmed, the display controller 49 may control the bird's-eye view video 100 to be displayed.

The processes performed by the bird's-eye view video generation device 40 may be executed along a flowchart which does not include the step of determining whether the vehicle speed of the vehicle V1 is equal to or less than a threshold, in the flowcharts illustrated in FIG. 4, FIG. 6, FIG. 7, and FIG. 9.

As the surrounding information of the vehicle V1, the surrounding information acquisition unit 43 may execute an imaging process on the surrounding video acquired by the video data acquisition unit 42, and detect the traffic light ahead of the vehicle V1 is red. As the surrounding information of the vehicle V1, the surrounding information acquisition unit 43 may also detect that a brake lamp of the preceding vehicle V2 is turned ON by an imaging process. As the surrounding information of the vehicle V1, the surrounding information acquisition unit 43 may also detect that the distance between the vehicle V1 and the preceding vehicle V2 detected by a sensor, which is not illustrated, becomes equal to or less than a threshold. Based on these pieces of information, the bird's-eye view video generation unit 45 may determine that the vehicle V1 is likely to stop.

With the present application, it is possible to effectively display the vehicle surroundings in a confirmable manner.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bird's-eye view video generation device, comprising:
    a video data acquisition unit configured to acquire surrounding video data captured by imagers for capturing videos of surroundings of a vehicle;
    a surrounding information acquisition unit configured to acquire surrounding information indicating a state of the surroundings around the vehicle;
    a vehicle information acquisition unit configured to acquire vehicle information including a speed of the vehicle;
    a bird's-eye view video generation unit configured to generate a bird's-eye view video of a display area in which the surroundings of the vehicle is displayed by performing a viewpoint conversion process on the surrounding video data acquired by the video data acquisition unit and performing a synthesizing process on multiple pieces of the surrounding video data on which the viewpoint conversion process has been performed; and
    a display controller configured to cause a display to display the bird's-eye view video generated by the bird's-eye view video generation unit in at least one of a case in which an entrance/exit into/from which the vehicle can enter/exit is located at a side of the vehicle based on the surrounding information acquired by the surrounding information acquisition unit and the vehicle information acquired by the vehicle information acquisition unit, and a case in which a starting point of a branch lane is located at the side of the vehicle based on the surrounding information acquired by the surrounding information acquisition unit and the vehicle information acquired by the vehicle information acquisition unit, and when it is determined that the vehicle is likely to stop and block at least a part of the entrance/exit or the starting point of the branch lane.

2. The bird's-eye view video generation device according to claim 1, wherein
    the display controller is further configured to cause the display to display the bird's-eye view video when a direction indicator of the vehicle is turned ON based on the vehicle information acquired by the vehicle information acquisition unit.

3. The bird's-eye view video generation device according to claim 1, wherein
    the display controller is further configured to generate the bird's-eye view video in which the display area of the surrounding video that includes the entrance/exit or the starting point of the branch line is enlarged in at least one of the case in which the entrance/exit into/from which the vehicle can enter/exit is located at the side of the vehicle based on the surrounding information acquired by the surrounding information acquisition unit and the vehicle information acquired by the vehicle information acquisition unit and the case in which the starting point of the branch lane is located at the side of the vehicle based on the surrounding information acquired by the surrounding information acquisition unit and the vehicle information acquired by the vehicle information acquisition unit.

4. The bird's-eye view video generation device according to claim 1, wherein
    the display controller s further configured to generate the bird's-eye view video in which the display area is shifted such that an area of the entrance/exit or the starting point of the branch line is displayed relatively widely in at least one of the case in which the entrance/exit into/from which the vehicle can enter/exit is located at the side of the vehicle based on the surrounding information acquired by the surrounding information acquisition unit and the vehicle information acquired by the vehicle information acquisition unit and the case in which the starting point of the branch lane is located at the side of the vehicle based on the surrounding information acquired by the surrounding information acquisition unit and the vehicle information acquired by the vehicle information acquisition unit.

5. The bird's-eye view video generation device according to claim 1, wherein
    the display controller is further configured to generate the bird's-eye view video in which the display area is changed such that an area of the entrance/exit or the starting point of the branch line is displayed in an enlarged manner in at least one of the case in which the entrance/exit into/from which the vehicle can enter/exit is located at the side of the vehicle based on the surrounding information acquired by the surrounding information acquisition unit and the vehicle information acquired by the vehicle information acquisition unit and the case in which the starting point of the branch lane is located at the side of the vehicle based on the surrounding information acquired by the surrounding information acquisition unit and the vehicle information acquired by the vehicle information acquisition unit.

6. The bird's-eye view video generation device according to claim 1, wherein
    the display controller is further configured to end displaying the bird's-eye view video when a predetermined time for which no operation of the vehicle is performed has elapsed since the display controller caused the display to display the bird's-eye view video.

7. A bird's-eye view video generation device, comprising:
a video data acquisition unit configured to acquire surrounding video data captured by imagers for capturing videos of surroundings of a vehicle;
a surrounding information acquisition unit configured to acquire surrounding information indicating a state of the surroundings around the vehicle;
a vehicle information acquisition unit configured to acquire vehicle information including a speed of the vehicle, and at least one of a preceding vehicle information of a preceding vehicle that moves in front of the vehicle and a surrounding vehicle information of a following vehicle that moves behind the vehicle;
a bird's-eye view video generation unit configured to generate a bird's-eye view video of a display area in which the surrounding video data acquired by the video data acquisition unit and performing a synthesizing process on multiple pieces of the surrounding video data on which the viewpoint conversion process has been performed; and
a display controller configured to cause a display to display the bird's-eye view video generated by the bird's-eye view video generation unit in at least one of a case in which at least one surrounding vehicle a direction indicator of which is turned ON is located based on the surrounding information acquired by the surrounding information acquisition unit, a case in which an entrance/exit into/from which the vehicle can enter/exit is located at a side of the vehicle based on the surrounding information acquired by the surrounding information acquisition unit and the vehicle information acquired by the vehicle information acquisition unit, and a case in which a starting point of a branch lane is located at the side of the vehicle based on the surrounding information acquired by the surrounding information acquisition unit and the vehicle information acquired by the vehicle information acquisition unit, and
when a spend of the preceding vehicle is equal to or less than a threshold, when a distance between the vehicle and the preceding vehicle is equal to or less than a threshold, or when a relative speed between the vehicle and the preceding vehicle is equal to less than a threshold based on the preceding vehicle information acquired by the vehicle acquisition unit, or
when a distance between the vehicle and the following vehicle is equal to or less than a threshold based on the surrounding vehicle information and the vehicle information acquired by the vehicle information acquisition unit.

8. The bird's-eye view video generation device according to claim 7, wherein the display controller is further configured to cause the display to display the bird's-eye view video when a direction indicator of the vehicle is turned ON based on the vehicle information acquired by the vehicle information acquisition unit.

9. The bird's-eye view video generation device according to claim 7, wherein the display controller is further configured to generate the bird's-eye view video in which the display area of the surrounding video that includes the entrance/exit or the starting point of the branch line is enlarged in at least one of the case in which the entrance/exit into/from which the vehicle can enter/exit is located at the side of the vehicle based on the surrounding information acquired by the surrounding information acquisition unit and the vehicle information acquired by the vehicle information acquisition unit and the case in which the starting point of the branch lane is located at the side of the vehicle based on the surrounding information acquired by the surrounding information acquisition unit and the vehicle information acquired by the vehicle information acquisition unit.

10. The bird's-eye view video generation device according to claim 7, wherein the display controller is further configured to generate the bird's-eye view video in which the display area is shifted such that an area of the entrance/exit or the starting point of the branch line is displayed relatively widely in at least one of the cases in which the entrance/exit into/from which the vehicle can enter/exit is located at the side of the vehicle based on the surrounding information acquired by the surrounding information acquisition unit and the vehicle information acquired by the vehicle information acquisition unit and the case in which the starting point of the branch lane is located at the side of the vehicle based on the surrounding information acquired by the surrounding information acquisition unit and the vehicle information acquired by the vehicle information acquisition unit.

11. The bird's-eye view video generation device according to claim 7, wherein the display controller is further configured to generate the bird's-eye view video in which the display area is changed such that an area of the entrance/exit or the starting point of the branch line is displayed in an enlarged manner in at least one of the case in which the entrance/exit into/from which the vehicle can enter/exit is located at the side of the vehicle based on the surrounding information acquired by the surrounding information acquisition unit and the vehicle information acquired by the vehicle information acquisition unit and the case in which the starting point of the branch lane is located at the side of the vehicle based on the surrounding information acquired by the surrounding information acquisition unit and the vehicle information acquired by the vehicle information acquisition unit.

12. The bird's-eye view video generation device according to claim 7, wherein the display controller is further configured to end displaying the bird's-eye view video when a predetermined time for which no operation of the vehicle is performed has elapsed since the display controller caused the display the bird's-eye view video.

13. A bird's-eye view video generation method, comprising:
acquiring surrounding video data captured by imagers for capturing videos of surroundings of a vehicle;
acquiring surrounding information indicating a state of the surroundings around the vehicle;
acquiring vehicle information including a speed of the vehicle;
generating a bird's-eye view video of a display area in which the surroundings of the vehicle is displayed by performing a viewpoint conversion process on the acquired surrounding video data and performing a synthesizing process on multiple pieces of the surrounding video data on which the viewpoint conversion process has been performed; and
causing a display to display the generated bird's-eye view video in at least one of a case in which at least one surrounding vehicle a direction indicator of which is turned ON is located based on the surrounding information acquire by the surrounding information acquisition step, a case in which at least one surrounding vehicle a direction indicator of which is turned ON is located based on the surrounding information acquired by the surrounding information acquisition step, a case in which an entrance/exit into/from which the vehicle can enter/exit is located at a side of the vehicle based on the surrounding information acquired by the surrounding information acquisition step and the vehicle information acquired by the vehicle information acquisition step, and a case in which a starting point of a branch lane is located at the side of the vehicle based on the surrounding information acquired by the surrounding information acquisition step and the vehicle information acquired by the vehicle information acquisition step, and when it is determined that the vehicle is likely to stop and block at least a part of the entrance/exit or the starting point of the branch lane.

* * * * *